United States Patent [19]

Webb

[11] 4,328,568
[45] May 4, 1982

[54] DUAL MODE SONAR SYSTEM

[75] Inventor: Herbert H. Webb, Burlington, Canada

[73] Assignee: Westinghouse Canada Inc., Hamilton, Canada

[21] Appl. No.: 196,305

[22] Filed: Oct. 14, 1980

[30] Foreign Application Priority Data

Feb. 4, 1980 [CA] Canada ................................ 345008

[51] Int. Cl.³ ............................................. G01S 15/02
[52] U.S. Cl. ..................................... 367/101; 367/95; 367/97
[58] Field of Search ........................... 367/95, 101, 97

[56] References Cited

U.S. PATENT DOCUMENTS 3,943,482  3/1976  Murphree et al. .................. 367/101
4,259,734  3/1981  Harmel ............................... 367/101

Primary Examiner—Richard A. Farley
Attorney, Agent, or Firm—Robert H. Fox; Edward H. Oldham

[57] ABSTRACT

A digital sonar system including a redundant receiver channel is arranged to operate substantially simultaneously in both F.M. and C.W. modes. Upon failure of one receiver channel the system reverts to a single mode or alternate modes on alternate cycles.

2 Claims, 2 Drawing Figures

DUAL MODE SONAR SYSTEM

BACKGROUND OF THE INVENTION

A sonar system is limited in detection ability either by reverberation or by noise. A target having a very low doppler frequency shift because it is slow moving may be reverberation-limited because the return frequency is so close to the transmitted frequency. A fast moving target on the other hand may be at longer range and while there is adequate frequency shift to enable receiver operation to separate the echo from reverberation, ambient noise becomes a problem.

Because both these limitations may apply at the same time with different targets, it has been attempted to overcome this problem by operating the system in different modes sequentially. For example, an FM pulse is transmitted to detect targets otherwise limited by reverberation while a continuous wave pulse is used in the next cycle to detect noise-limited targets. As the transmitter shifts from one mode to the other on alternate cycles the receiver is similarly switched.

However, in sonar, detection usually depends on the spatial correlation of several echoes in order to differentiate between false alarms and targets. Operation in this sequential alternate mode results in greater time being required to receive the necessary number of responses to detect and differentiate between targets.

Many sonar systems nowadays operate using digital technology because of the ability to combine many channels into a single channel by means of time-division multiplexing. However, this gives rise to the situations where the failure of a single component can cause the loss of the entire system. To avoid this risk, it is known to use a redundant channel which is available to replace the primary channel in the event of failure.

SUMMARY OF THE INVENTION

In accordance with the present invention, it is proposed to use the second or redundant channel for one mode of operation of the sonar system and the other channel for the other mode of operation, so that the system can operate substantially simultaneously in both modes.

DESCRIPTION OF THE PREFERRED EMBODIMENT

As previously indicated, a sonar system is subject to limitation of two kinds. First, objects which have only a small relative motion will return transmitted signals at substantially the same frequency as the signal they receive. Second, objects which have substantial relative velocity may be obscured by ambient noise.

Figure 1:
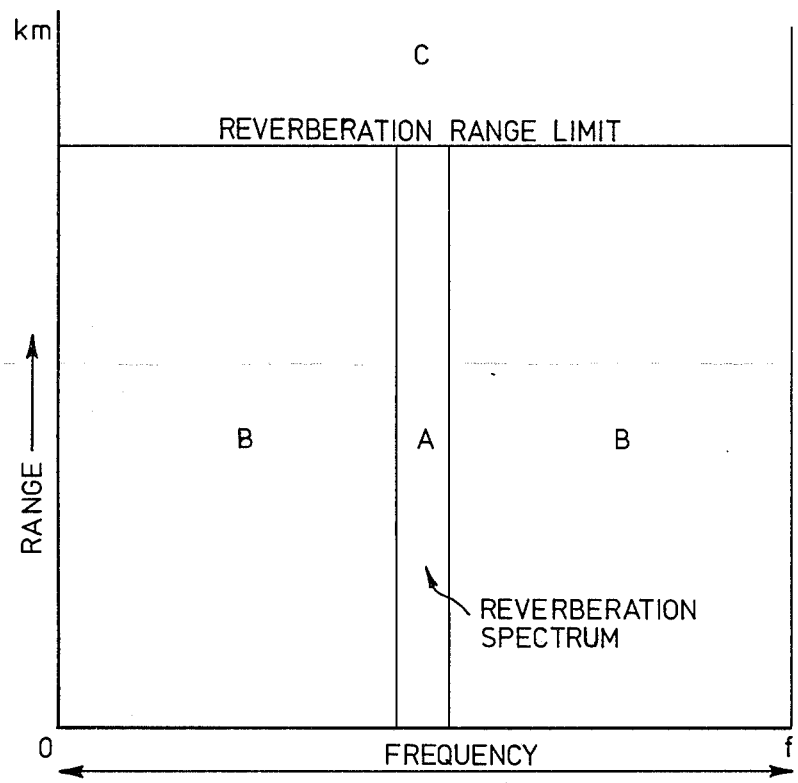
FIG. 1 is a diagram useful in explaining the two mode limitations of a sonar system.

Considering FIG. 1 it will be seen that with a continuous wave pulse, that is, one having no frequency modulation, the return signals can be grouped into three domains as shown in FIG. 1. A on FIG. 1 represents a band of frequencies substantially equal to the transmitted frequencies persisting out to a range where the reverberation falls to the same level as the ambient noise. Within this reverberation frequency and time (or range) period, it is difficult to detect an echo. If, however, the target has a velocity, the return signal is shifted out of the reverberation frequency band into areas B either below or above the transmitted frequency. Signals of this nature can be processed successfully if the signal receiver can exclude the reverberation. Usually selective signal processing is used, constituting a bank of narrow band filters capable of excluding the reverberation frequency, in which case signals can be usefully processed as long as they are above the ambient noise level.

Other signals from moving or stationary targets will fall in the area C which is beyond the reverberation range. Here the only question of discrimination relates to the ambient noise and signals can be processed from this area as long as they are in excess of the ambient noise by a sufficient degree.

In order to process targets falling within the A zone, i.e. slow moving targets within the reverberation range limit, it has been proposed in the past to use a frequency modulated pulse for transmission. By frequency modulating the transmitted energy, the receiver can more easily discriminate target signals from reverberation. It can be shown for example that the signal processing gain of an optimum receiver for a known pulse shape is proportional to the ratio of the echo power to the masking noise per 1 Hz bandwidth, i.e.

$$S/N \text{ (OUT)} \; \alpha \; S/N \text{ (IN)} \times \frac{\text{TARGET ECHO POWER}}{\text{NOISE POWER IN 1Hz.}}$$

Thus, by spreading the reverberation, the masking power in 1 Hz will be reduced. The target echo power remains unchanged, although spread over the same band.

In order to take advantage of both of these modes of transmission, it has been proposed in the past to alternately transmit a CW pulse and then a FM pulse.

Figure 2:
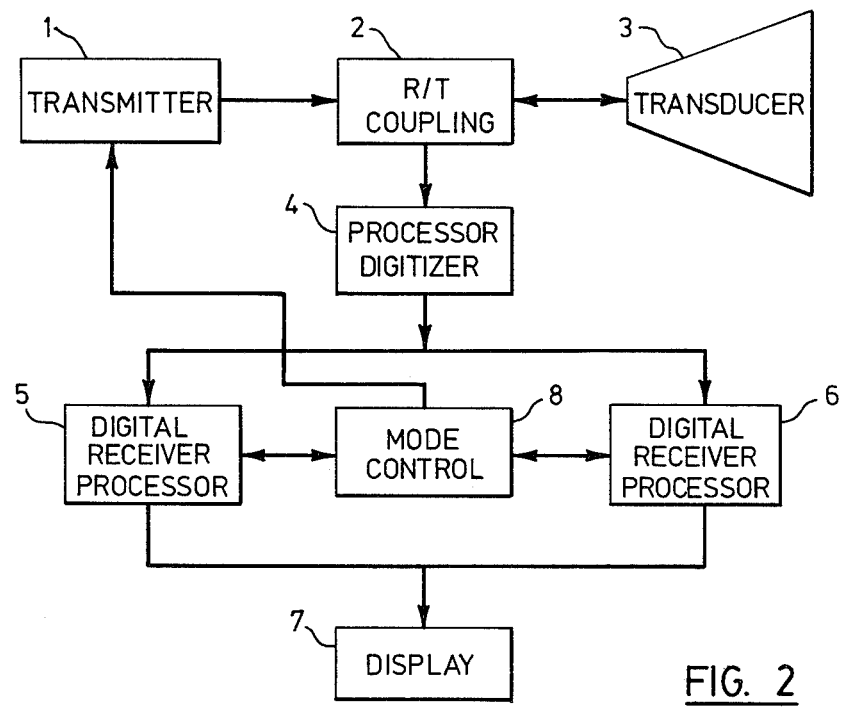
FIG. 2 is a block diagram of a sonar system in accordance with the present invention.

A clearer understanding of this arrangement may be had from a consideration of the block diagram of FIG. 2 where there is shown a sonar transmitter 1 coupled through an RT coupler 2 to a transducer 3. The transducer 3 is also coupled back through the RT coupler through the processor digitizer 4 of the receiver and thence through two identical channels 5 and 6 to the display 7. In the prior art, the transmitter 1 would first transmit a continuous wave pulse, for example, a 40 microsecond long pulse at 7.2 KHz and then a frequency modulated pulse varying in frequency about a center frequency of 7.2 KHz. The received signal from the CW pulse would be received by the transducer coupled through the processor digitizer 4 to the digital receiver processor 5 and thence to the display 7. In the next transmitted pulse during the next interval, the FM signal would be transmitted to the transducer 3 and then return signals coupled from the RT coupler to the processor digitizer 4 and once again through the digital receiver processor 5, but this time the processor 5 would be adjusted to properly process the FM information. The two sets of information both from the CW returns and from the FM returns would be displayed on display 7.

In accordance with the present invention, the transmitter 1 normally transmits a CW pulse at a given frequency, for example, 7.2 KHz and then immediately afterwards transmits an FM pulse centered at another frequency, for example, 6.4 KHz. Digital receiver processor 5 is arranged to process the signals received in response to the CW transmission at 7.2 KHz while digital receiver processor 6 is arranged to process signals received in response to the FM transmission at 6.4 KHz. The outputs from both receivers are simultaneously applied to the display. In this way, the advantages of both CW and FM transmission are obtained from a single system.

In the event that one of the digital receiver processors fails, the remaining processor can either continue to process the same information as it had previously or the system can be arranged to operate sequentially, as in the past.

It will be noticed that the mode control 8 is coupled to both digital receivers and to the transmitter. During normal operation the mode control causes digital receiver processor 5 to process the responses to CW transmissions while digital receiver processor 6 responds to signals returned from FM transmissions. On the other hand, if either of these processors fail, a signal is applied to the mode control which can, as previously indicated, either cause the transmitter 1 to transmit in a single mode which is then received and processed by the remaining active signal processor or the transmitter can be arranged to operate sequentially cyclically first in one mode and then the other and the digital receiver processor which is still active is controlled in its mode to process receive signals in accordance with the transmitted signals.

The frequency of the receiver processors must be determined to minimize interference. Particularly where a number of ships are operating in the same area, it will be necessary to allocate the different ship frequencies in such a way that their different frequencies do not overlap.

I claim:

1. A sonar system including a transmitter capable of transmitting first pulses of one character and second pulses of a second character, first and second receivers capable of receiving and processing echoes resulting from either of said first and second pulses, said transmitter normally arranged to transmit in a single operating cycle first and second pulses of said first and second characteristic immediately sequential in time, said first receiver being arranged to receive and process echoes resulting from said first pulse and said second receiver being arranged to receive and process echoes resulting from said second pulse wherein, upon failure of said first receiver, means controlling the character of said first and second pulses permits transmission of pulses of only said first character and means to control said second receiver to enable said second receiver to receive and process only echoes resulting from said first pulse.

2. A sonar system including a transmitter capable of transmitting first pulses of one character and second pulses of a second character, first and second receivers capable of receiving and processing echoes resulting from either of said first and second pulses, said transmitter normally arranged to transmit in a single operating cycle first and second pulses of said first and second characteristic immediately sequential in time, said first receiver being arranged to receive and process echoes resulting from said first pulse and said second receiver being arranged to receive and process echoes resulting from said second pulse wherein, upon failure of said first receiver, means controlling the character of said first and second pulses permits transmission of a pulse of the first character in one operating cycle and a pulse of a second character in the next operating cycle and means to control said second receiver to receive and process only echoes resulting from said first pulse during said one operating cycle and echoes resulting from said second pulse during said next operating cycle.

* * * * *